(12) United States Patent
Kurfiss et al.

(10) Patent No.: US 10,186,997 B2
(45) Date of Patent: Jan. 22, 2019

(54) OVERVOLTAGE ARRESTER FOR AN ELECTRICAL DRIVE

(71) Applicant: Robert Bosch GmbH, Stuttgart (DE)

(72) Inventors: Jochen Kurfiss, Lomersheim (DE); Egon Gaber, Markgroeningen (DE); Marc Eschenhagen, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 1148 days.

(21) Appl. No.: 14/374,600

(22) PCT Filed: Jan. 3, 2013

(86) PCT No.: PCT/EP2013/050072
§ 371 (c)(1),
(2) Date: Jul. 25, 2014

(87) PCT Pub. No.: WO2013/110482
PCT Pub. Date: Aug. 1, 2013

(65) Prior Publication Data
US 2014/0375238 A1    Dec. 25, 2014

(30) Foreign Application Priority Data
Jan. 26, 2012    (DE) .................. 10 2012 201 097

(51) Int. Cl.
*H02P 9/10*    (2006.01)
*B60L 3/00*    (2006.01)
(Continued)

(52) U.S. Cl.
CPC .............. *H02P 9/10* (2013.01); *B60L 3/0023* (2013.01); *B60L 3/04* (2013.01); *H02H 9/045* (2013.01);
(Continued)

(58) Field of Classification Search
CPC .. Y02T 10/7077; Y02T 10/6217; B60L 11/14; B60W 10/08; B60W 20/00
See application file for complete search history.

(56) References Cited

U.S. PATENT DOCUMENTS 5,187,426 A    2/1993    Maass et al.
5,285,344 A    2/1994    Heitzmann
(Continued)

FOREIGN PATENT DOCUMENTS

| DE | 4432520 | 2/1996 |
|---|---|---|
| DE | 102008043402 | 5/2010 |
| EP | 2403133 | 1/2012 |

OTHER PUBLICATIONS

International Search Report for Application No. PCT/EP2013/050072 dated Oct. 24, 2013 (English Translation, 2 pages).

*Primary Examiner* — Shawki S Ismail
*Assistant Examiner* — Zoheb Imtiaz
(74) *Attorney, Agent, or Firm* — Michael Best & Friedrich LLP

(57) ABSTRACT

The invention relates to an overvoltage arrester for an electrical drive, especially a drive for a motor vehicle. The overvoltage arrester is designed to be connected to an on-board power supply system of a motor vehicle. The overvoltage arrester is designed to reduce any overvoltage produced in the on-board power supply system when a load is switched off. According to the invention, the overvoltage arrester is connected to a control unit for an electronically commutated electrical machine. The overvoltage arrester has an input for an on-board power supply system and is designed to detect when a pre-determined voltage value is exceeded and to produce an overvoltage signal depending on whether the voltage value is exceeded. The control unit is designed to transfer the electrical machine from an operating mode in which the machine generates power to an at least (Continued)

partial power-loss mode or to a mode in which it operates as a motor.

9 Claims, 5 Drawing Sheets

(51) Int. Cl.
*B60L 3/04* (2006.01)
*H02J 7/14* (2006.01)
*H02H 9/04* (2006.01)
*H02P 29/032* (2016.01)
*H02P 29/024* (2016.01)
*H02H 7/09* (2006.01)

(52) U.S. Cl.
CPC ............ *H02J 7/14* (2013.01); *H02P 29/0241* (2016.02); *H02P 29/032* (2016.02); *H02H 7/09* (2013.01); *Y02T 10/642* (2013.01)

(56) References Cited

U.S. PATENT DOCUMENTS

| | | | |
|---|---|---|---|
| 2003/0231442 A1* | 12/2003 | Gorgerino | H02H 9/04 361/21 |
| 2004/0246641 A1* | 12/2004 | Sugimoto | H02M 5/458 361/91.1 |
| 2005/0007719 A1* | 1/2005 | Philipp | H01C 7/12 361/119 |
| 2005/0017694 A1 | 1/2005 | Masson et al. | |
| 2007/0163820 A1* | 7/2007 | Hoogenraad | B60K 6/48 180/65.28 |
| 2007/0200531 A1* | 8/2007 | Armiroli | B60K 6/485 318/811 |
| 2008/0007883 A1 | 1/2008 | Arndt et al. | |
| 2008/0156553 A1* | 7/2008 | Hoogenraad | B60K 6/48 180/65.29 |
| 2011/0221374 A1* | 9/2011 | Maebara | H02M 7/53871 318/494 |

* cited by examiner

OVERVOLTAGE ARRESTER FOR AN ELECTRICAL DRIVE

BACKGROUND OF THE INVENTION

The invention relates to an overvoltage arrester for an electrical drive, especially a drive for a motor vehicle. The overvoltage arrester is designed to be connected to an on-board power supply system of a motor vehicle. The overvoltage arrester is designed to reduce any overvoltage produced in the on-board power supply system when a load is switched off.

A problem was recognized with overvoltage arresters in motor vehicles that are known from the prior art that said arresters, for example formed from semiconductor components, can themselves be destroyed by an overvoltage occurring in the on-board power supply system. Consumers which are connected to the on-board power supply system and are susceptible to an overload are then destroyed along with the overvoltage arrester.

SUMMARY OF THE INVENTION

According to the invention, the overvoltage arrester of the type mentioned at the beginning of the application is connected to a control unit for an electronically commutated electrical machine. The overvoltage arrester has an input for an on-board power supply system and is designed to detect when a pre-determined voltage value is exceeded and to produce an overvoltage signal depending on whether the voltage value is exceeded. The control unit is designed to transfer the electrical machine, as a function of the overvoltage signal, from an operating mode in which the machine generates power to an at least partial power-loss mode or to a mode in which it operates as a motor. In an advantageous manner, an electrical power can thus be converted very quickly in the electrical machine into dissipated heat in the power-loss mode or into a mechanical torque in a mode in which said electrical machine operates as a motor. The electrical machine can preferably be operated again in the generator operating mode, in particular in a purely generator operating mode, after the on-board power supply system voltage has been normalized.

The electrical energy fed into the on-board power supply system by means of the overvoltage can in this way be advantageously reduced in the on-board power supply system.

In a preferred embodiment, the overvoltage arrester, also referred to below as arrester, has at least one semiconductor circuit breaker connected to the input thereof. The semiconductor circuit breaker is designed, as a function of a pre-determined voltage value, to generate a current from the input via the semiconductor circuit breaker towards a ground connection and thus to reduce the on-board power supply system voltage—in particular by means of dissipating electrical charges.

The semiconductor circuit breaker is, for example, formed by at least one Zener diode, a series circuit of at least one Zener diode with at least one semiconductor diode, by a TVS diode (TVS=transient voltage suppression), at least one field effect transistor that is controlled by means of a Zener diode, or by at least one varistor. A response time of the semiconductor switch is preferably between one and ten nanoseconds.

In another embodiment, the semiconductor circuit breaker has a field effect transistor, the switching path of which is designed to connect the terminal for the on-board power supply system voltage to the ground terminal. The field effect transistor is connected on the control terminal side to a voltage regulator comprising a comparator, wherein the voltage regulator draws a voltage dropping across the switching path of the field effect transistor as an input control variable in addition to a nominal value voltage representing the pre-determined voltage value.

In a preferred embodiment, the control unit is designed to actuate the electrical machine for the generation of a rotating magnetic field and to change a phase angle of an actuation as a function of the overvoltage signal and thus to operate the electrical machine at least partially in the power-loss mode and/or in the mode in which it operates as a motor.

As a result, an electrical energy can be advantageously consumed in the motor operating mode and thus be withdrawn from the on-board power supply system.

In a preferred embodiment, the control unit is designed, as a function of the overvoltage signal, to reduce a phase angle of an actuation of the electrical machine, in particular an angular difference between a rotor angle and a rotating field generated by a stator of the electrical machine. The control unit is preferably designed to adjust the angular difference between less than 90 degrees and 0 degrees.

In this embodiment, a power dissipation of a power consumed in the power output stage of the control unit can be adjusted by means of the angular difference. At an angular difference of 90 degrees, the electrical machine is operated completely in the generator operating mode. At a phase angle of zero degrees, the electrical machine is operated neither in the generator operating mode nor in the motor operating mode. The electrical power consumed by the electrical machine is consumed as power dissipation in the electrical machine or additionally in the power output stage.

The control unit is preferably designed, as a function of the overvoltage signal, to dispose of an angular difference between a rotor angle and a rotating field generated by a stator of the electrical machine. In this embodiment, the previously mentioned angular difference is zero degrees. Hence, the electrical machine can be advantageously used as an electrical load—even during a longer time interval—in order to consume the electrical energy introduced into the on-board power supply system and thus to reduce the on-board power supply system voltage.

The control unit is preferably designed, as a function of the overvoltage signal, to change an angular difference between a rotor angle and a rotating field generated by a stator of the electrical machine in such a way that the electrical machine can be transferred from the generator operating mode into the full motor operating mode.

The electrical machine can thus—preferably in a pre-determined time interval—consume the excess electrical energy in the on-board power supply system by generating a torque up to the point where the on-board power supply system voltage drops below the pre-determined voltage value.

In a preferred embodiment, the control unit is designed to actuate the electrical machine in a pulse width modulated manner by means of a pulse width modulator. The control unit is further preferably designed to invert an actuation model generated by the pulse width modulator of the control unit as a function of the overvoltage signal.

By inverting the actuation model, which corresponds to a mirroring of the actuation signal generated by the pulse width modulator of the control unit on a time axis, the electrical machine can advantageously very quickly shift, in particular without carrying out additional calculation algorithms, the phase angle of the actuation by 180 degrees. If the phase angle for actuating the electrical machine is, for example, at 90 degrees prior to a generation of the overvoltage signal, so that the electrical machine is completely situated in the generator operating mode, the electrical machine is then transferred completely to the motor operating mode after the overvoltage signal has been generated as a function of said overvoltage signal. The pure inversion of the pulse width modulated actuation signal advantageously does not require a complicated calculation algorithm.

The inverted, pulse width modulated actuation model can thus be advantageously generated by the inverter, in particular by means of a transistor circuit designed for inverting the pulse width modulated actuation model. In another embodiment, the control unit is designed to generate the inverted actuation model—for example controlled by a calculation algorithm.

The control unit is preferably designed to reduce an exciting current from an excitation coil of the electrical machine as a function of the overvoltage signal via a semiconductor component connected to the excitation coil, in particular a semiconductor switch or a diode. By short circuiting or reversing the polarity of the excitation coil, the exciting current can be advantageously reduced; thus enabling the on-board power supply system voltage to be advantageously reduced by means of the rapid de-excitation of the electrical machine produced in this manner.

By means of the aforementioned rapid de-excitation of the electrical machine, a stage of the overvoltage arrester can be advantageously formed, which—controlled by means of the overvoltage signal—can operate after the previously described change in the phase angle of the actuation of the electrical machine. In this way, the components of the electrical machine which are switched to consumption of electrical power by means of the change in the phase angle, in particular of the power output stage or the stator coils, can advantageously not be destroyed by the waste heat generated in the components.

It is furthermore advantageous that the semiconductor circuit breaker previously mentioned cannot be destroyed by overheating after the high-speed excitation has been activated.

In a preferred embodiment of the overvoltage arrester, the overvoltage arrester comprises at least one semiconductor circuit breaker. In an overvoltage arrester of multi-stage design, the semiconductor circuit breaker can preferably act as the first stage of the multi-stage protection in a temporal sequence of a multi-stage intervention. During the activation of the semiconductor circuit breaker, the arrester can generate the overvoltage signal.

In addition, the phase angle of the actuation of the electrical machine can be changed during the temporal course of the overvoltage protection. After the phase angle has been changed, for example after the previously described phase reversal from the generator operating mode to the motor operating mode of the electrical machine as a result of inverting the pulse width modulated actuation model, electrical energy can further be withdrawn from the on-board power supply system, so that the previously mentioned semiconductor circuit breaker no longer has to completely convert the electrical energy into waste heat. Changing the phase angle can form a step following the first step, in particular a second or third step, of a multi-stage intervention of the kind previously mentioned.

In a third stage in the temporal course of the overvoltage protection, the previously mentioned high-speed excitation of the electrical motor can take on the further protection, so that the at least one semiconductor circuit breaker and the components of the electrical machine and/or the control unit that are heated by the waste heat as a result of the change in the phase angle cannot be destroyed by being heated up excessively high. The control unit is preferably designed to activate the stages formed in this way as a function of the overvoltage signal, which stages can thereupon intervene in a temporally consecutive manner to reduce the overvoltage.

Unlike in the previously described embodiment, in which the control unit is designed to short circuit the excitation coil of the electrical machine, the control unit in the other embodiment is designed, as a function of the overvoltage signal, to reverse the polarity of the excitation coil of the electrical machine via a semiconductor switch, in particular an H-bridge, also know as full-bridge, connected to said excitation coil.

The invention also relates to a method for operating an overvoltage arrester for an on-board power supply system of a motor vehicle, said system comprising an electrical machine.

In one procedural step, an exceeding of a pre-determined voltage value of an on-board power supply system voltage is detected when the electrical machine is in the generator operating mode, and an overvoltage signal representing the fact that the pre-determined voltage value has been exceeded is generated. The cause of the on-board power supply system voltage being exceeded results, for example, from an electrical load being shed.

In a further preferable manner, a rapid de-excitation of an excitation magnetic field of the electrical machine is introduced as a function of the overvoltage signal.

In a further step, a temporal rise in the on-board power supply system voltage is detected and a phase angle of an actuation of the electrical machine is changed as a function of the rise in voltage such that the electrical machine is transferred from the generator operating mode at least partially or completely to the motor operating mode.

A semiconductor circuit breaker is furthermore activated in the method when a pre-determined voltage threshold value of the on-board power supply system voltage is exceeded, said semiconductor circuit breaker being designed to connect a terminal of the on-board power supply system voltage to a ground terminal in a low impedance manner and thus to reduce electrical energy from the on-board power supply system.

The semiconductor circuit breaker is preferably formed by a TVS diode or a field effect transistor controlled by means of a Zener diode.

The electrical machine is preferably transferred from the generator operating mode to the motor operating mode by inverting a pulse width modulated actuation model.

BRIEF DESCRIPTION OF THE DRAWINGS

The invention is now described below with the aid of the drawings and further exemplary embodiments. Further advantageous embodiment variants ensue from the features depicted in the drawings and described in the claims. In the drawings:

DETAILED DESCRIPTION

Figure 1:
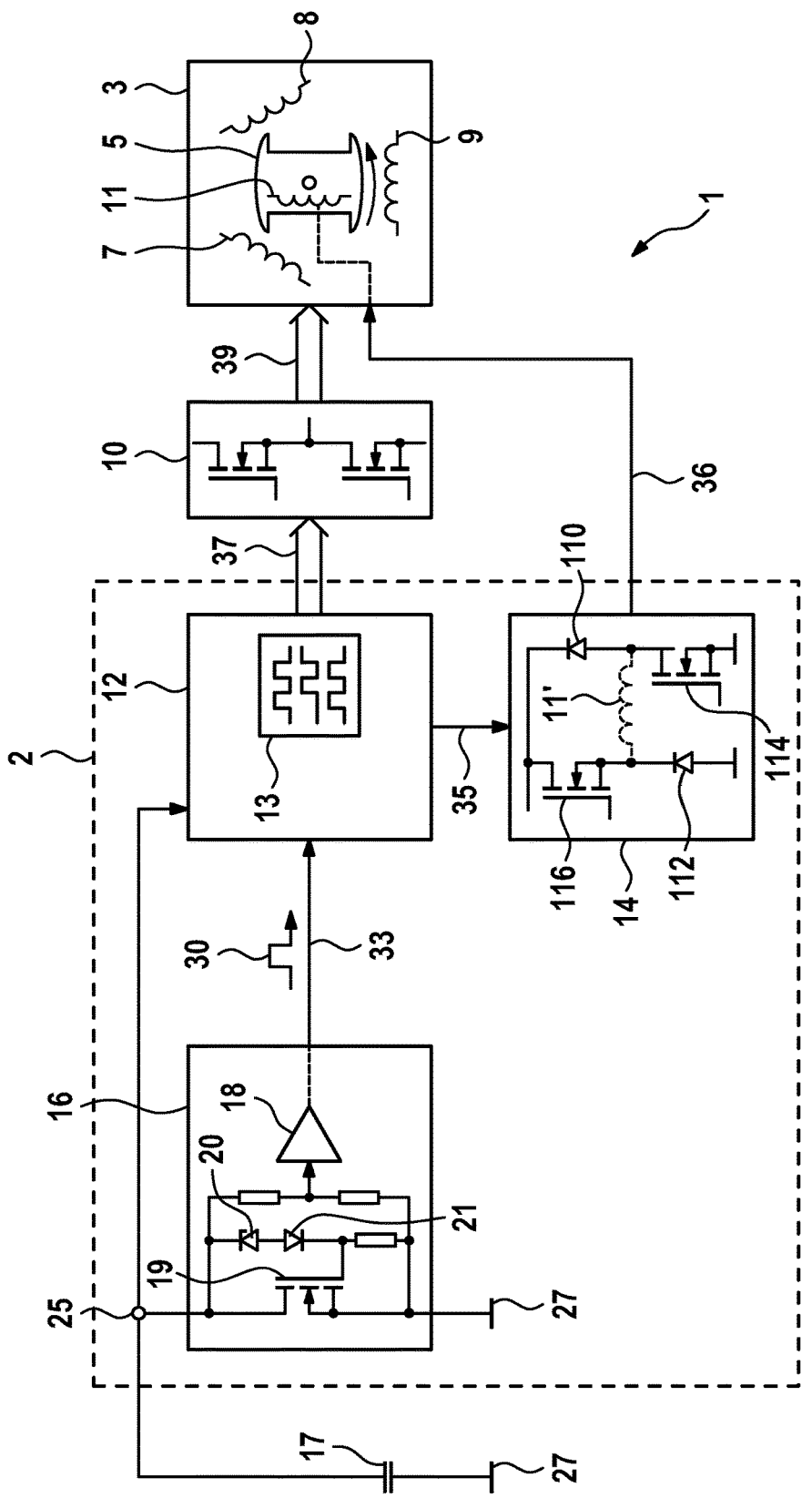
FIG. 1 shows schematically an exemplary embodiment for an electrical drive comprising a three-stage overvoltage arrester.

FIG. 1 shows an exemplary embodiment for an electrical drive 1. The electrical drive 1 comprises an electrical machine that includes a stator 3 and a rotor 5. In this exemplary embodiment, the stator 3 has three stator coils, namely a stator coil 7, a stator coil 8 and a stator coil 9. In another embodiment of the drive, the stator 3 can also have more than three stator coils, for example five or ten stator coils.

The electrical drive 1 also comprises a power output stage 10 and an overvoltage arrester 2.

The electrical drive 1 also comprises a processing unit 12 as control unit of the electrical machine, which is designed to actuate the power output stage 10 in order to pass current through the stator coils of the stator 3 and thus to generate a rotating magnetic field. To this end, the processing unit 12 has a pulse width modulator 13. The pulse width modulator 13 is designed to generate control signals for activating control terminals of semiconductor switches of the power output stage 10 and to output said control signals on the output side. The processing unit 12 is composed, for example, of a microprocessor, a microcontroller, an FPGA (FPGA=field programmable gate array) or an ASIC (ASIC=application specific integrated circuit). The processing unit 12 is connected on the output side via a (in this exemplary embodiment) multi-channeled connection 37 to the power output stage 10. The power output stage 10 is connected on the output side via a multi-channeled connection 39 to the stator, and connected there to the stator coils 7, 8, and 9. The stator coils 7, 8, 9 can, for example, be connected to one another in a star arrangement.

The processing unit 12 is connected on the input side to a terminal 25 for an on-board power supply system voltage. The processing unit 12 is designed to change a phase angle of the actuation as a function of an on-board power supply system voltage received at terminal 25 in order to generate the rotating magnetic field as a function of the rotor position of the rotor 5. To this end, the processing unit 12 can, for example, comprise an analog-digital converter which is designed to convert the on-board power supply system voltage into a digital output signal. The processing unit 12 is also connected on the input side via a connection 33 to a semiconductor circuit breaker 16.

In this exemplary embodiment, the semiconductor circuit breaker 16 comprises a field effect transistor 19, the control terminal of which is connected to a voltage section, formed from a resistor and at least one diode, in this exemplary embodiment a Zener diode 20 and an additional semiconductor diode 21 connected in series with the Zener diode 20.

The source terminal of the field effect transistor 19 is connected to a ground terminal 27; the drain terminal of the field effect transistor 19 is connected to the terminal 25 for the on-board power supply system voltage. The field transistor 19 is designed, as a function of a pre-determined voltage, in particular a voltage threshold value—controlled by the Zener diode 20 and the semiconductor diode 21—to connect the terminal 25 to the ground terminal 27 in a low impedance manner. In so doing, the semiconductor circuit breaker 16 can at least for a short time, as long as the field transistor 19 is not heated too much, reduce an electrical energy introduced by overvoltage into the on-board power supply system by means of a discharging process and convert said electrical energy into waste heat.

In this exemplary embodiment, the semiconductor protection device 16 also comprises a comparator 18. The comparator is connected on the input side via a voltage divider to the terminal 25 for the on-board power supply system voltage and via a further terminal of the voltage divider to the ground connection 27. The comparator is designed to generate an overvoltage signal 30 as a function of a predetermined voltage threshold value and to output said signal on the output side. In this exemplary embodiment, the voltage threshold value for generating the overvoltage signal 30 is designed smaller than the predetermined voltage value, wherein the field effect transistor 19—in particular in the linear mode—is switched on in a low impedance manner when said predetermined voltage value has been exceeded by the on-board power supply system voltage. The passive semiconductor components of the semiconductor circuit breaker 16 represent in this exemplary embodiment a first stage of a protection system having a plurality of stages. In this exemplary embodiment, the first stage of the protection system determines the activation of the second and third stage by means of the voltage threshold value of the comparator 18. A rising on-board power supply system voltage, which has, for example, a voltage increase of, for example, 100 volts per millisecond, can thus be detected by means of the comparator 18; and the overvoltage signal 30 can be generated by the comparator 18 and outputted on the output side of said comparator at a predetermined voltage threshold value, for example 60 volts.

The response time—for example determined by a filter time of a digital filter of the processing unit—of the comparator is, for example, five microseconds.

The processing unit 12 is designed as the second stage of the overvoltage protection to introduce a rapid de-excitation of the electrical machine, in particular of the excitation coil 11, as a function of the overvoltage signal 30. To this end, the processing unit 12 is connected on the output side via a connecting line 35 to a supply and high-speed de-excitation unit 14 of the excitation coil 11. The supply and high-speed de-excitation unit 14 has in this exemplary embodiment a full bridge comprising two controllable semiconductor switches 114 and 116 and two diodes 110 and 112. The excitation coil 11, which is connected on the output side via a connecting line 36 to the supply and high-speed de-excitation unit 14, is depicted in the circuit diagram of the supply and high-speed de-excitation unit 14 with a dashed line as excitation coil 11'. During normal operation, current is passed through the excitation coil 11 via the semiconductor switches 114 and 116, in this exemplary embodiment field effect transistors. The field effect transistor 114 constitutes a low-side transistor which can be permanently switched on during normal operation, wherein the transistor 116 constitutes a high-side transistor, which can be actuated from the processing unit 12 and there by the pulse width modulator 13 in accordance with a pulse pattern. In another embodiment, the high-side transistor 116 is permanently switched on. The diode 110 then operates as a free-wheeling diode, wherein the low-side transistor can be actuated in a pulsed manner. The supply and high-speed de-excitation unit 14 is designed in this exemplary embodiment to block field effect transistors as a function of an overvoltage signal received on the input side via the connecting line 35; thus enabling the current flow through the excitation coil 111 when the semiconductor switches 114 and 116 are open to be quickly dissipated via the diodes 110 and 112 and an applied on-board power supply system voltage.

In this exemplary embodiment, an intermediate circuit capacitor 17 is also connected to the terminal 25. The further terminal of the intermediate circuit capacitor 17 is connected to the ground terminal 27. The previously mentioned rise in voltage is also limited in this exemplary embodiment by the intermediate circuit capacitor 17 by means of a further charge intake into said intermediate circuit capacitor 17.

The processing unit 12 is designed in this exemplary embodiment to detect a rise in voltage of the on-board power supply system voltage received on the input side and to change the phase angle of the actuation of the power output stage 10 and thereby also of the stator 3 as a function of the rise in voltage, in particular of a temporal change in the on-board power supply system voltage. In this exemplary embodiment, the processing unit 12 is designed to invert the actuation model generated by the pulse width modulator 13 as a function of the rise in voltage. As a result, the electrical machine, in particular the stator 3 and the rotor 5, is transferred from the generator operating mode to the motor operating mode. In this way, the semiconductor circuit breaker 16, which becomes conductive in a low impedance manner starting at the previously mentioned predetermined voltage value, can be advantageously prevented from being destroyed by the energy converted into waste heat in the same.

A filtering of the on-board power supply system voltage signal and an evaluation up until a decision to introduce the phase reversal, in particular by inverting the actuation model, require a calculating time, wherein the processing unit 12 is designed to introduce the phase reversal before the semiconductor circuit breaker 16 has been destroyed as a result of heating.

A temporal course of the voltage curves and the mode of operation of the processing unit, the semiconductor circuit breaker 16 and the supply and high-speed de-excitation unit 14 are described below and depicted in FIG. 5.

Figure 2:
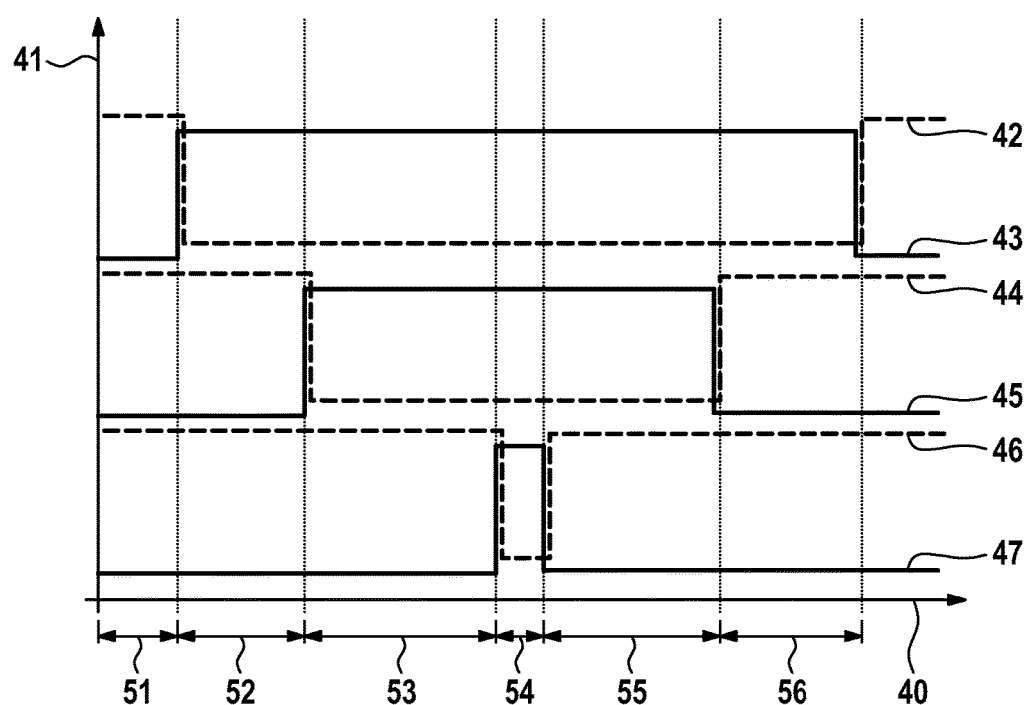
FIG. 2 shows an actuation model generated by means of pulse width modulation for actuating a power output stage connected to the stator in order to generate a rotating magnetic field.

FIG. 2 shows an actuation model for actuating the power output stage 10, which was already shown in FIG. 1, in order to generate a rotating magnetic field by means of the stator 3 of the electrical machine. The actuation model is depicted in a diagram. The diagram has a time axis 40 and an amplitude axis 41. An actuation signal 43 for the generator operating mode of the stator coil 7, an actuation signal 45 for the generator operating mode of the stator coil 8 and an actuation signal 47 for the generator operating mode of the stator coil 9 are depicted.

An actuation signal 42 for the motor operating mode of the stator coil 7 which is inverse to the actuation signal 43, an actuation signal 44 for the motor operating mode of the stator coil 8 which is inverse to the actuation signal 45 and an actuation signal 46 for the motor operating mode of the stator coil 9 which is inverse to the actuation signal 47 are depicted. The inversion of the actuation signals of the stator coil and generation of inverted actuation signals requires, for example, a processing time of five microseconds. For this reason, the inversion of the phase angle is significantly faster than calculating a changed phase angle by means of the processing unit 12. The calculation of the changed phase angle requires, for example, a processing time of one millisecond.

The time intervals 51, 52, 53, 54, 55 and 56, which in each case successively follow one another, are depicted. At the beginning of each time interval, the actuation model and therefore the energization state of the stator 3 are changed.

Figure 3:
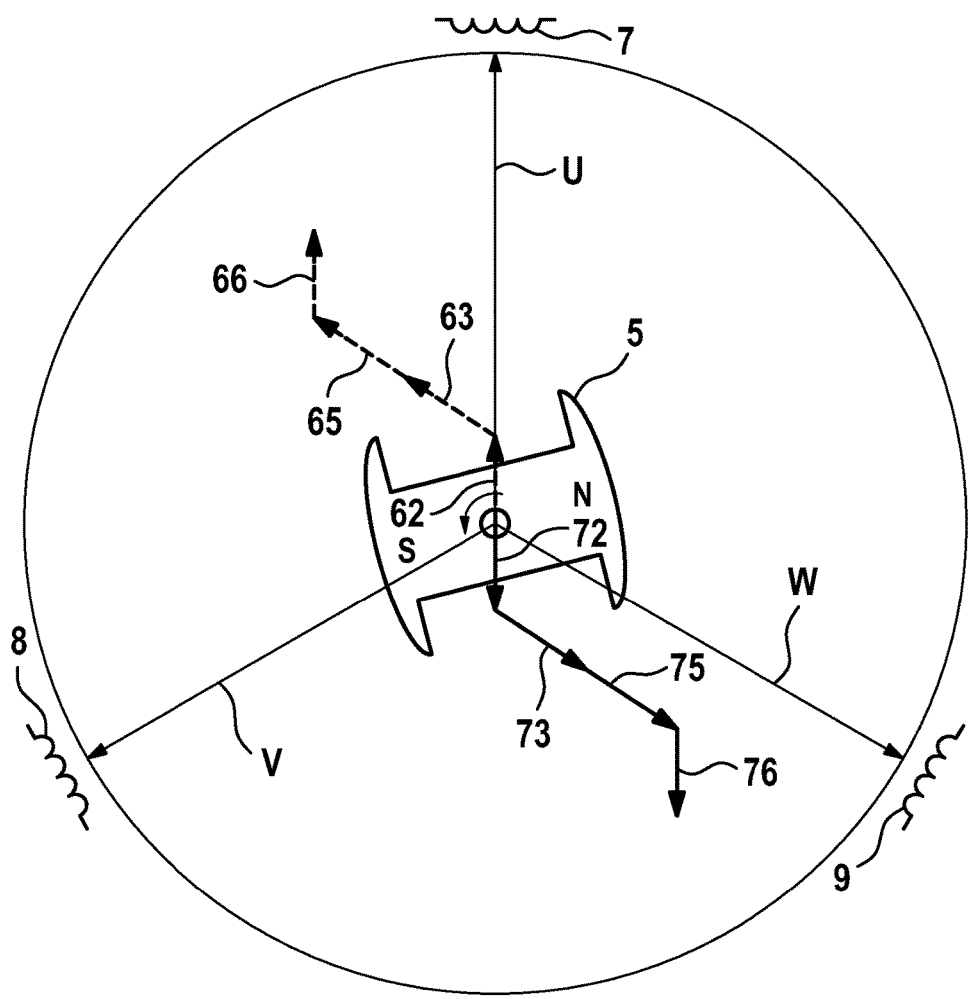
FIG. 3 shows schematically a course of a magnetic field vector generated by means of the actuation model depicted in FIG. 2 in the generator operating and motor operating modes.

FIG. 3 shows the rotor 5 that was already depicted in FIG. 1. Phase angles U, V and W are also depicted along a revolution of the rotor 5, wherein the phase angle U corresponds to the stator coil 7, the phase angle V to the stator coil 8 and the phase angle W to the stator coil 9.

Field vectors are also depicted which respectively correspond to a switching state of the stator depicted in FIG. 2. A field vector 62 from a magnetic field which is generated by the stator during the time interval 52 is depicted. A field vector 63 which corresponds to the time interval 53 is also depicted as well as a field vector 65 which corresponds to the time interval 55 and a field vector 66 which corresponds to the time interval 56. The field vectors 62, 63, 65 and 66 represent thereby a directional course of the magnetic field generated by the stator resulting from the actuation model depicted in FIG. 2. Field vectors 72, 73, 75 and 76, the magnetic field of which was in each case generated in the generator operating mode of the electrical machine in FIG. 1, are depicted in FIG. 3. Field vectors 62, 63, 65, and 66 are also depicted which thereby correspond by way of example to the motor generating mode of the electrical machine in FIG. 1.

The actuation signals in FIG. 2 which correspond to the generator operating mode are the signals 43, 45, and 47. The field vector 72 corresponds to the field profile in the time interval 52, the field vector 73 to the field profile in the time interval 53, the field vector 75 to the field profile in the time interval 55 and the field vector 76 to the field profile in the time interval 56. The directions of the field vectors in the generator operating and in the motor operating mode are directed opposite to one another in the same time interval.

Figure 4:
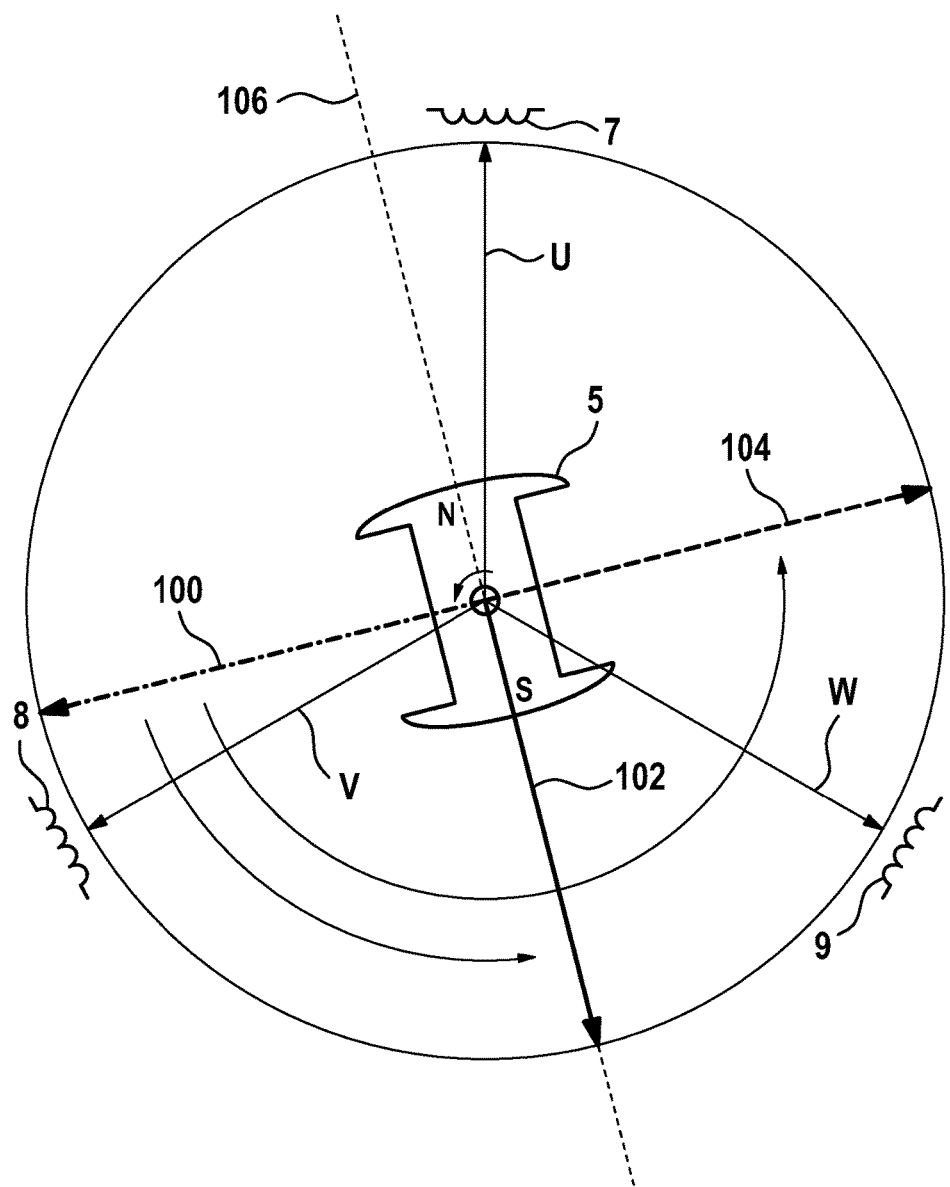
FIG. 4 shows a phase angle of an actuation of the electrical drive depicted in FIG. 1, wherein the phase angle is changed from the generator operating mode to a neutral mode and from there further to a motor operating mode.

FIG. 4 shows the rotor 5, which was already depicted in FIG. 3, together with the rotor angles U, V and W. A phase angle 100 by means of a vector which runs orthogonally with respect to a field axis 106 of the excitation field of the rotor 5 is depicted. The field axis 106 represents a rotor angle of the rotor 5.

The phase angle 100 runs in the direction of rotation of the rotor 5 so as to trail the rotor field by 90 degrees; thus enabling the electrical machine to be located in the purely generator operating mode. The phase angle 102 of an actuation is also depicted in which the phase angle difference between the field of the rotor 5 and the field of the stator 3 vanishes, i.e. is zero degrees. The electrical machine is located completely in the power-loss mode. In this operating state, the electrical machine cannot receive or deliver any mechanical power so that the received electrical energy can be converted into heat by means of the electrical machine.

A phase angle 104 is also depicted which runs oppositely to the phase angle 100. The electrical machine is located in the motor operating mode in the case of an actuation using the phase angle 104. In the case of the phase angle 104, the stator field leads the rotor field by 90 degrees.

The change of the phase angle from the generator operating mode, represented by the phase angle 100 with respect to the phase angle 102, can, for example, occur by means of the processing unit 12 depicted in FIG. 1 in a closed-loop control as a function of the rise in voltage detected by said processing unit 12, in particular of the change in voltage per time. For example, the processing unit 12 can change the phase angle of the actuation—originating from the generator operating mode—in such a way that the phase angle difference is reduced when the rise in voltage becomes greater. Upon the rise in voltage becoming greater, the generator operating mode is thus taken back further all the way to a phase angle 102, whereat a generator operating mode is no longer present and the electrical machine is located strictly in the power-loss mode.

For that reason, the processing unit in FIG. 1 can comprise, for example, a discriminator which is designed to adjust the phase angle as a function of the rise in voltage. If, for example, the processing unit 12 determines a further energy intake by the electrical machine is necessary in the case of a very steep increase in voltage, the processing unit 12 can then displace the phase angle further in the direction of the phase angle 104, up to the actual direction of the phase angle 104. As a result, the amount of time in the motor operating mode of the electrical machine and thus the amount of mechanical power delivered can be determined by the processing unit in FIG. 1 as a function of the rise in voltage of the on-board power supply system voltage. The processing unit 12 can, for example, carry out the change in the phase angle up to a point in time whereat the on-board power supply system voltage at terminal 25 undershoots a predetermined voltage value, for example 50 volts. If the further decreasing on-board power supply system voltage has again reached the normal value thereof, for example 48 volts, the overvoltage signal can then be interrupted, in particular prevented from being generated, by the processing unit 12 via the connecting line 35, thus enabling the rapid de-excitation by means of the supply and high-speed de-excitation unit 14 to be stopped and the excitation coil 11 to be operated again in the normal mode for generating an electric field.

The previously described reduction of the overvoltage in the on-board power supply system thus requires between 60 and 100 milliseconds, whereby an operation of an electric vehicle can, for example, not be impaired and the electric vehicle can continue to drive smoothly without jerking due to the inertia of all of the moving masses.

Figure 5:
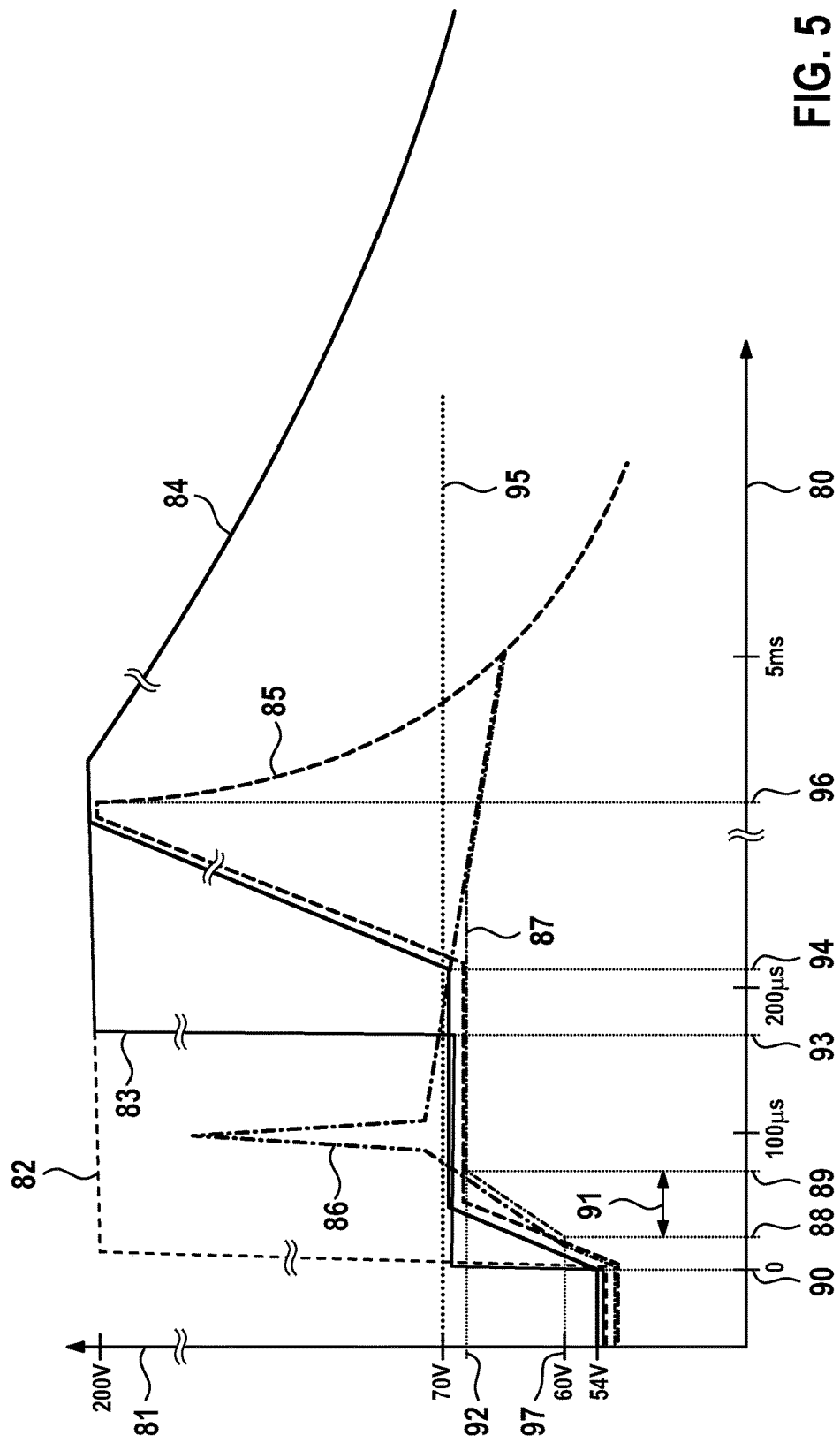
FIG. 5 shows a diagram in which temporally dependent voltage profiles of an on-board power supply system voltage are depicted, the voltage profiles respectively corresponding to degrees of protection that are different from one another, wherein a degree of protection does not comprise an overvoltage protection or comprises between one and three protection stages.

FIG. 5 shows a diagram in which voltage curves of the on-board power supply system voltage are depicted, which, for example, can be acquired at the terminal 25 in FIG. 1 from the semiconductor circuit breaker 16 and from the processing unit 12. The diagram has a time axis 80 and an amplitude axis 81 for the on-board power supply system voltage. At the point in time 90, a load shedding, also referred to as load dump, takes place in the on-board power supply system. A voltage curve 82 is depicted which represents the voltage curve of the on-board power supply system voltage if the electrical drive in FIG. 1 does not have a semiconductor circuit breaker 16, a phase angle change generated by the processing unit 12 and a rapid de-excitation by means of the supply and high-speed de-excitation unit 14. A voltage value 95 is also depicted which represents a threshold value for a destruction of electronic components, for example electronic components that are connected to the on-board power supply system and are provided with power by the same. The electronic components can, for example, be a power steering unit, an air conditioning compressor or a water pump. The processing unit 12 depicted in FIG. 1, the power output stage 10 and the intermediate circuit capacitor 12 likewise constitute an exemplary embodiment for an electronic component which can be destroyed at an operating voltage above the voltage value 95.

A voltage curve 83 is also depicted which represents an electrical drive which includes a semiconductor circuit breaker comprising at least one Zener diode or comprising a suppressor diode, also referred to as a TVS diode. The Zener diodes or, respectively, suppressor diodes can still constantly maintain the on-board power supply system voltage below the voltage value 95 up to a point in time of approximately 150 microseconds after the point in time 90, the Zener diodes being destroyed at a point in time 93. The on-board power supply system voltage then increases again, in this exemplary embodiment up to 200 volts. The electronic components mentioned above are then also destroyed.

A voltage curve 84 is also depicted, which corresponds to an electrical drive after a load has been shed at the point in time 90, wherein the electrical drive includes at least one semiconductor circuit breaker comprising Zener diodes and an intermediate circuit capacitor. The intermediate circuit capacitor can still absorb energy between the point in time 93 and the point in time 94; thus enabling a slew rate of the on-board power supply system voltage and thus an activation of the semiconductor circuit breaker to be slowed down. At the point in time 94, the Zener diodes and/or field effect transistors of the semiconductor circuit breaker are also destroyed due to heating. The on-board power supply system voltage rises in the further temporal course thereof up to 200 volts and then drops again when the energy stored in the capacitor is discharged.

A voltage curve 85 is also depicted which corresponds to an electrical drive which includes a semiconductor circuit breaker comprising at least one Zener diode and a processing unit like the processing unit 12 in FIG. 1. The electrical drive is designed to introduce a rapid de-excitation, said drive comprising an intermediate circuit capacitor. The rapid de-excitation takes effect, for example, 200 milliseconds after the activation thereof. It can be seen that the field effect transistors of the semiconductor circuit breaker are also destroyed at a point in time 94 in the case of the voltage curve 85, which causes a rise in voltage in the on-board power supply system voltage. Not until a point in time 96, approximately at four to five milliseconds after the point in time 90 of the load being shed, does the rapid de-excitation of the electrical machine visibly take effect, which is reflected in a sharper drop in voltage in comparison to the voltage curve 84.

A voltage curve 86 is also depicted which corresponds to the electrical drive which is depicted in FIG. 1 and comprises the overvoltage arrester 2 which, in the case of voltage curve 86, does not have a semiconductor circuit breaker, in particular a field effect transistor 19, a Zener diode 20 and a diode 21. The semiconductor circuit breaker 16 comprises only the comparator 18 in the case of the curve 86 representing the voltage course, said comparator generating, in a time interval 91, the overvoltage signal 30 for introducing a phase intervention by the processing unit 12.

A voltage peak is visible, represented by the transient in the region of the point in time 89 of the voltage curve 86, said transient being generated by parasitic inductances between the intermediate circuit capacitor and the semiconductor circuit breaker as a function of the abrupt phase reversal from the generator operating to the motor operating or power-loss mode. The on-board power supply system voltage only briefly—for example during a time interval of a microsecond—exceeds the voltage value 95 which represents a destruction limit of electronic components. At the point in time of 200 microseconds, the voltage curve again undershoots the voltage value 95 and then drops further to a normal level, for example 48 volts, which is not depicted in this diagram.

A voltage curve 87 is also depicted which is induced by the overvoltage arrester 2 of the drive 1, which arrester is depicted in FIG. 1.

The previously mentioned load shedding of an electrical load which is connected to the on-board power supply system takes place at the point in time 90. At the point in time 88, the overvoltage signal 30 is generated by the comparator 18 of the semiconductor circuit breaker 16 upon the predetermined voltage value 97 being exceeded—in this exemplary embodiment 60 volts. A temporal change in voltage of the on-board power supply system voltage is detected by the processing unit in the time interval 91. At the point in time 89, the phase change of the phase angle is started by the processing unit 12 as a function of the rise in voltage. In another embodiment, a short circuiting of the phase is started at the point in time 89.

The previously described voltage peak in the region of the point in time of 100 microseconds of the voltage curve 86 is caused by the semiconductor protection elements of the semiconductor circuit breaker 16, in this exemplary embodiment by the field effect transistor 19, controlled by the Zener diode 20 and the semiconductor diode 21, when a predetermined voltage value 92 is exceeded. The voltage curve of the on-board power supply system voltage does not exceed the destruction limit of the electronic components, in particular the voltage value 95 during the further course thereof, beginning at the point in time 90 when the load is shed.

The invention claimed is:

1. An overvoltage arrester for an electrical drive, said arrester configured to
   be connected to an on-board power supply system of a motor vehicle,
   to be connected to a control unit for an electronically-commutated electrical machine, and
   to reduce overvoltage produced in the on-board power supply system when a load is switched off, said overvoltage arrester comprising:
   an input for an on-board power supply system, the overvoltage arrester configured to
   detect when a pre-determined overvoltage value is exceeded and to produce an overvoltage signal depending on whether the overvoltage value is exceeded, wherein the control unit is designed to transition the electrical machine, in response to receiving the overvoltage signal, from an operating mode in which the electrical machine generates power to at least one other mode selected from the group of a partial power-loss mode to dissipate electrical power as heat and a motor operating mode to dissipate electrical power as a mechanical torque,
   and wherein the control unit is designed, as a function of the overvoltage signal, to reduce an exciting current through an excitation coil of the electrical machine via a semiconductor component connected to the excitation coil.

2. The overvoltage arrester according to claim 1, wherein the overvoltage arrester has at least one semiconductor circuit breaker connected to the input, said semiconductor circuit breaker being designed, as a function of a pre-determined voltage value, to generate a current from the input via the semiconductor circuit breaker towards a ground terminal and thus reduce the on-board power supply system voltage.

3. The overvoltage arrester according to claim 1, wherein the control unit is designed to actuate the electrical machine for the generation of a rotating magnetic field and to change a phase angle of the actuation of the electrical machine as a function of the overvoltage signal, and to operate the electrical machine at least partially in the power-loss mode and/or in the motor operating mode.

4. The overvoltage arrester according to claim 3, wherein the control unit is designed, as a function of the overvoltage signal, to reduce a phase angle of the actuation of the electrical machine.

5. The overvoltage arrester according to claim 4, wherein the control unit is designed, as a function of the overvoltage signal, to dispose of an angular difference between a rotor angle and a rotating field generated by the stator of the electrical machine.

6. The overvoltage arrester according to claim 3, wherein the control unit is designed, as a function of the overvoltage signal, to change an angular difference between a rotor angle and a rotating field generated by the stator of the electrical machine in such a way that the electrical machine can be transferred from the generator operating mode to the full motor operating mode.

7. The overvoltage arrester according to claim 6, wherein the control unit is designed to actuate the electrical machine in a pulse width modulated manner by means of the pulse width modulator, and the control unit is designed to invert an actuation model generated by a pulse width modulator of said control device as a function of the overvoltage signal.

8. The overvoltage arrester according to claim 3, wherein the control unit is designed, as a function of the overvoltage signal, to reverse the polarity of an excitation coil of the electrical machine by means of a semiconductor switch connected to the excitation coil.

9. A method for operating an overvoltage protection for an on-board power supply system of a motor vehicle having an electrical machine, the method comprising:
   during a generator operating mode of the electrical machine, determining whether a pre-determined overvoltage value of an on-board power supply system voltage has been exceeded,
   generating an overvoltage signal in response to detecting that the pre-determined overvoltage value has been exceeded, wherein, a rapid de-excitation of an excitation magnetic field of the electrical machine is introduced as a function of the overvoltage signal,
   reducing, with a control unit and via a semiconductor component connected to an excitation coil of the electrical machine, an exciting current through the excitation coil of the electrical machine as a function of the overvoltage signal;
   detecting a temporal rise in the on-board power supply system voltage; and
   changing, as a function of the rise in voltage, a phase angle of an actuation of the electrical machine in such a way that the electrical machine is transitioned from a generator operating mode to a motor operating mode by inverting a pulse width modulated actuation model.

* * * * *